United States Patent
Williams et al.

(10) Patent No.: US 6,369,545 B1
(45) Date of Patent: Apr. 9, 2002

(54) NEURAL NETWORK CONTROLLED POWER DISTRIBUTION ELEMENT

(75) Inventors: James D. Williams, Evergreen; Timothy W. Harvey, Colorado Springs, both of CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/641,245

(22) Filed: Aug. 17, 2000

Related U.S. Application Data
(60) Provisional application No. 60/149,305, filed on Aug. 17, 1999.

(51) Int. Cl.⁷ .............................. H02J 7/00; H04Q 7/20
(52) U.S. Cl. ....................................... 320/101; 455/427
(58) Field of Search ........................ 320/101; 455/427

(56) References Cited

U.S. PATENT DOCUMENTS

| | | | |
|---|---|---|---|
| 5,644,207 A | * 7/1997 | Lew et al. .................. | 320/101 |
| 5,957,409 A | * 9/1999 | Castiel et al. ........... | 244/158 R |
| 6,043,629 A | * 5/2000 | Ashley et al. ............. | 320/119 |
| 6,064,180 A | * 5/2000 | Sullivan et al. ............ | 320/132 |
| 6,184,656 B1 | * 2/2001 | Karunasiri et al. ......... | 320/119 |

FOREIGN PATENT DOCUMENTS

| JP | 11-041830 A | * 2/1999 | ............ H02J/7/34 |
|---|---|---|---|

OTHER PUBLICATIONS

Zafar Ullah et al., "Fast Intelligent Battery Charging: Neural–Fuzzy Approach", 6/96, IEEE AES Systems Magazine, 26–29.*

Timothy Wayne Harvey, "The use of Neural Networks in a Smart Battery Charger," Thesis from the University of Missouri–Rolla, 1995.

* cited by examiner

Primary Examiner—Gregory Toatley
(74) Attorney, Agent, or Firm—Marsh Fischmann & Breyfogle LLP

(57) ABSTRACT

The power distribution control element significantly improves the efficiency by which solar energy is distributed and controlled to large phased array antenna assemblies by providing current directly from photovoltaic cells to lithium-ion battery cells through a neural-network based charge controller. The small current required to operate each transmit/receive module is provided from an adjacent battery cell rather than a large centralized battery assembly located in the spacecraft bus. In the preferred embodiment, the charge control is regulated by a back-propagation neural network.

20 Claims, 3 Drawing Sheets

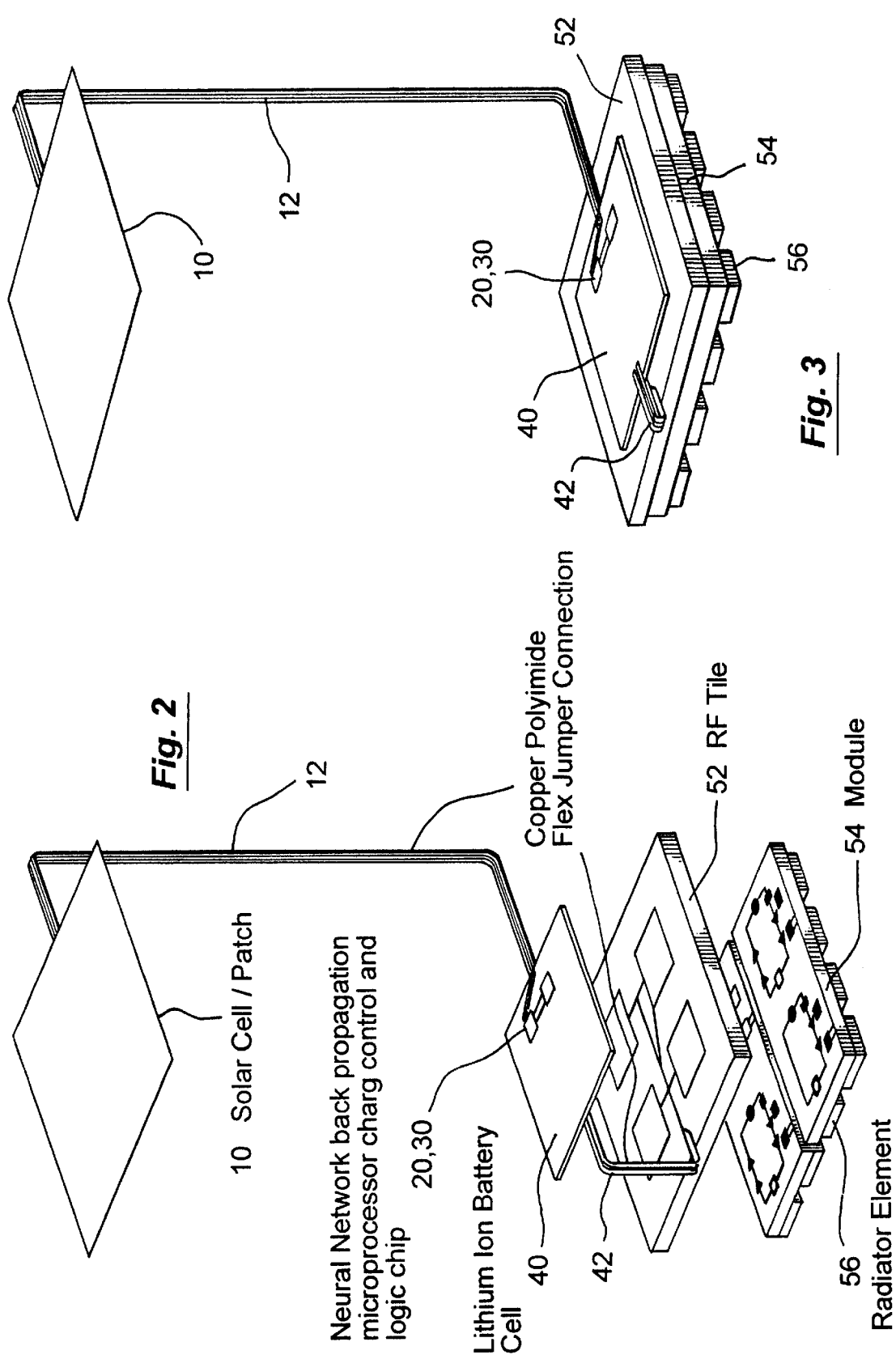

NEURAL NETWORK CONTROLLED POWER DISTRIBUTION ELEMENT

RELATED APPLICATION

The present application is based on the Applicants' U.S. Provisional Patent Application Ser. No. 60/149,305, entitled "Neural Network Controlled Power Distribution Element," filed on Aug. 17, 1999.

BACKGROUND OF THE INVENTION

1. Field of the Invention

The present invention relates generally to the field of electrical power systems. More specifically, the present invention discloses a neural network power distribution control element for a phased array antenna and similar distributed systems.

2. Statement of the Problem

Conventional space-borne phased array antennas, communication satellites and signal intelligence satellites currently use large solar arrays, heavy battery assemblies, and complex power distribution systems to operate. Large-area phased array antennas require enormous power to function. They tend to be heavy because of the area required by hundreds of thousands of radiator elements needed to accomplish the mission. Typically multiples of radiator elements are combined onto a single transmit/receive (TR) module and multiple TR modules are combined into a radio frequency (RF) tile, which provides a convenient building block with which to work. Ideally, each TR module is driven from a low voltage current (i.e., 3 to 4 volts).

Present power systems for such phased array antennas collect energy though the solar panels that is sent to a central voltage regulator and power conditioner from which large-capacity batteries (usually multiple 60 to 200 amp-hour) are charged. The batteries supply power to the bus and payload through a power distribution unit, typically at 28 volts. The voltage at the RF tiles is dropped to significantly lower levels through a voltage de-boost circuit that distributes the power to the TR modules. There are significant losses inherent to the cumulative inefficiencies associated with all of the steps from the solar collection to the TR modules.

For example, standard power systems for such phased array antennas use nickel-hydrogen or nickel-cadmium batteries, both of which have significant drawbacks associated with them, including life limitations due to depth of discharge, heavy packaging constraints, and reconditioning requirements. Lithium-ion batteries are a promising technology because they offer much lighter, more efficient assemblies. Several limitations stand in the way of their development. The individual cells don't interact well together and require separate charge controls. For 60 to 200 amp-hour battery assemblies, significant challenges in charge control, thermal dissipation, cell scalability and other technical problems face battery engineers. Also, in order to achieve long life from each battery (i.e., 50,000 cycles) the depth of discharge has to be limited to less than 10 percent, meaning that the overall size of battery becomes too large to take advantage of the high energy density ratio that Li-ion technology offers. Substantial research and development efforts have been dedicated to overcoming these deficiencies.

Solar energy can be converted into electricity by means of solar cells composed of various chemistries. One of the most efficient solar cell technologies is galium-arsenide dual junction, which can be as good as 25% efficient and development efforts promise 30% efficiencies in the near future. However, they are susceptible to degradation from radiation and require cover slides for protection, thus adding weight to the solar array. Furthermore, the cells within each string are connected in series which boosts the voltage to a higher level. The strings are then connected in parallel to send current from the solar array to the regulator, conditioner and battery through a heavy wire bundle. The fact that strings are wired in series results in the loss of an entire string should a single cell be lost due to cell failure, broken connection, shadow, etc.

3. Solution to the Problem

The present invention addresses many of the shortcomings associated with conventional power distribution systems for phased array antennas. The present system provides current directly from solar cells to lithium-ion battery cells through a charge control regulated by a neural network at each battery. The small current required to operate each TR module is provided by an adjacent battery, rather than a large centralized battery assembly located on the spacecraft bus.

This approach eliminates the need for the majority of power distribution components that are traditionally used to operate phased array antennas. This technology eliminates or replaces heavy components such as voltage regulators, power distribution units and wire harnesses with significantly lighter, less complex elements. It allows for small currents and small voltages to provide power to the TR modules avoiding loss due to long cable runs. It enables the use of lithium-ion cells that have much higher energy density ratios by eliminating the technological problems that are associated with large capacity lithium-ion battery assemblies. Use of lithium-ion technology represents about a 70% cost reduction in battery assemblies. The incorporation of a neural network charge controller increases battery life and eliminates the need for thousands of lines of software code and computations. This idea will yield significant improvements in costs associated with manufacturing, assembly and testing. Less efficient but much lighter and much less expensive solar cells such as copper indium diselenide (CIS) or amorphous silicon fabricated on an Upilex® mylar substrate to be used in conjunction with this concept offering further weight and cost savings and both contribute greatly to long life and graceful degradation of the payload.

This revolutionary approach can be used to reduce the weight and cost of any phased array space-borne antenna system. Also any electronic system requiring small voltages distributed over large areas would be potential candidates for utilizing this technology.

SUMMARY OF THE INVENTION

The present invention significantly improves the efficiency by which solar energy is distributed and controlled to large phased array antenna assemblies. By providing current directly from solar cells to lithium-ion battery cells through a neural network, charge control is accomplished at each battery using a microprocessor. The small current required to operate each TR module is provided from an adjacent battery cell rather than a large centralized battery assembly located in the spacecraft bus. In the preferred embodiment, the charge control is regulated by a back-propagation neural network.

BRIEF DESCRIPTION OF THE DRAWINGS

The present invention can be more readily understood in conjunction with the accompanying drawings, in which:

FIG. 2 is an exploded perspective view of one RF tile assembly in the present invention.

FIG. 3 is a perspective view corresponding to FIG. 2 showing the normal stacked configuration of an RF tile assembly.

DETAILED DESCRIPTION OF THE INVENTION

Figure 1:
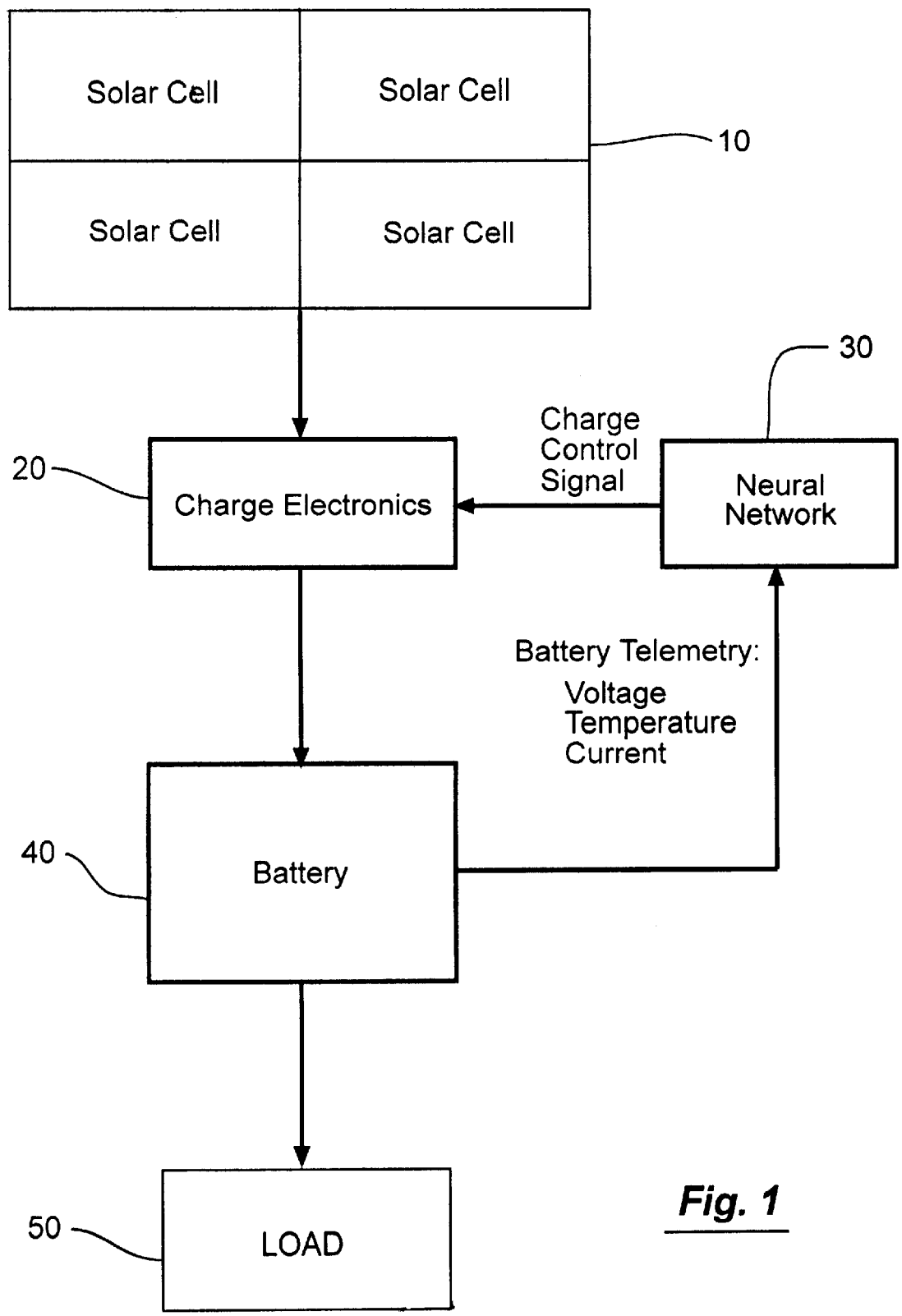
FIG. 1 is a simplified block diagram of present invention.

In large-area phased array antennas, hundreds of thousands of radiator elements may be required. Typically, multiples of radiator elements are combined onto a single transmit/receive (TR) module and multiple TR modules are combined into an RF tile which represents a convenient building block with which to work. Each RF tile is driven by a low voltage current (i.e., 3 to 4 volts). Because phased array antennas typically occupy large areas that tend to radiate heat rapidly, keeping the TR modules warm enough is usually of more concern than keeping them cool. The back of the antenna is an ideal location for solar arrays because of the excellent surface area on which to locate solar cells. The close proximity of the solar cells with the RF tiles provides thermal control benefits as well under most conditions.

The present system provides electrical DC power directly to the individual RF tiles 52 from solar cells 10 in relative close proximity. FIG. 2 is an exploded perspective view of one RF tile assembly in the present invention. FIG. 3 is a perspective view corresponding to FIG. 2 showing the normal stacked configuration of one RF tile assembly. Each RF tile 52 consists of four TR modules 54 that receives a 3.6 volt current from a single lithium-ion battery cell 40, and each TR module 54 consists of four radiators 56. The configuration shown uses a 3-inch square tile with 16 radiator elements 56 spaced equally at 0.75 inch on center. Preliminary analysis indicates that a Li-ion battery cell 40 (2-inch square by 0.1 inch thick) will accommodate conservative average power requirements of the RF tile 52. An innovative neural network microprocessor chip described in detail below controls the battery cell 40. Ultra-small, lightweight copper polyimide connections 12 and 42 are used to connect the solar cell 10 to the battery neural network microprocessor and battery 40, and the battery 40 to the RF tile 52.

By individually controlling each cell with a microprocessor, we can bypass the classical problems of charge control of Li-ion batteries. The battery cell 40 can be sized to meet the power requirements of the RF tile 52. These exceptionally small battery sizes allow the benefits of Li-ion technology to be realized without incurring the problems of large batteries. Li-ion technology has advantages over other batteries not only in terms of weight, but can also operate over a wider range of temperatures. Another benefit of using small batteries is that much of the battery mass (i.e., base plate, end plate, etc.) is eliminated. Conceivably, the battery cell 40 could be packaged within the RF tile 52 structure thereby acquiring further weight reduction.

Because of the low voltages and currents required by the RF tile 52, the small batteries 40 are ideally suited to incorporate the copper polyimide flex patch connections 12, 42, which contribute greatly to reliability and ease of manufacturing. The flex patch 12, 42 can be designed specifically for specific applications and launch environments. The microprocessor charge control chip can be integral to the fabrication of the cell 40. The need for voltage boost regulators, power distribution units and de-boost electronics to and from the spacecraft bus are eliminated as well as the wire harnesses. Depending upon mission requirements, potentially 450 pounds of equipment can be eliminated with this concept.

Solar cell sizing requirements are easily met with various chemistries. Copper indium diselenide (CIS) can be applied to this application with two immediate benefits. One is that when applied to a UPILEX® mylar substrate, it provides an exceptionally light and flexible solar collector. The other is that it lends itself to this modular, self-contained concept in a way that a single manufacturer could integrate the solar cell, battery and microprocessor in a single facility. The RF tile 52, battery 40, and solar collector components 10 can be parallel processed, assembled, and tested in a geometrically flat configuration prior to folding into the normal, stacked geometry as shown in FIG. 3.

Manufacturability, testability and reliability requirements can be accommodated simultaneously to produce a substantially less expensive, robust system. Another associated benefit is that solar array string failures are eliminated because the cells are not necessarily wired in series. With this approach, each cell is independent of the others, and thus the effect of a failure in a series configuration is eliminated.

Back-Propagation Neural Network to Control the Charge Logic of a Lithium-Ion Battery.

The current "state of art" battery chargers use microprocessor control to charge the battery based upon calculations derived from telemetry consisting of battery temperature, battery voltage, and battery charge current. The microprocessor relies upon software programmed onto the chip. Different code must be used for different usage environments and the battery control logic must deal with a nonlinear, battery chemical system.

Figure 4:
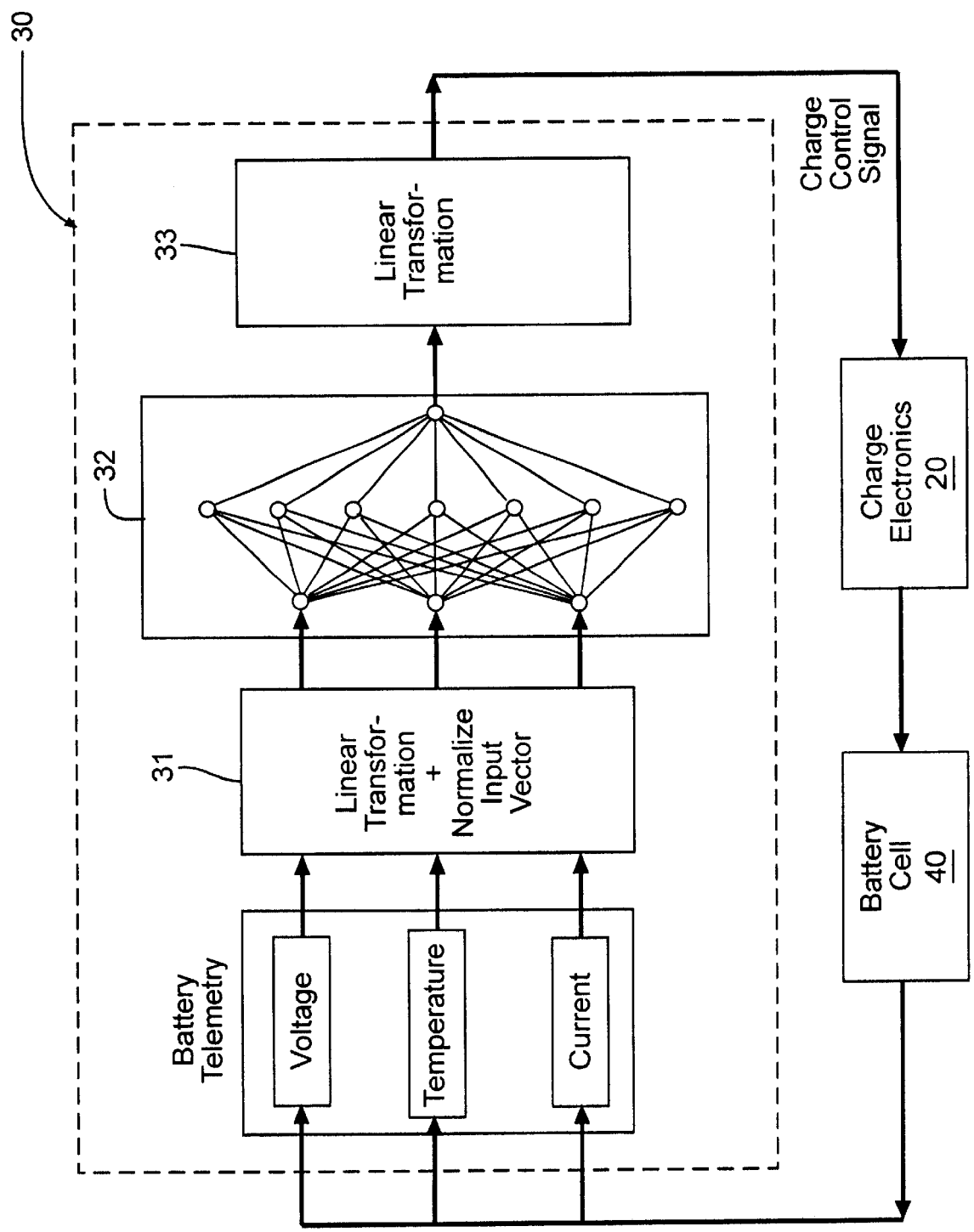
FIG. 4 is a block diagram of the neural network battery charger 30.

The present system uses a back-propagation neural network 30 to control battery charging as illustrated in FIGS. 1 and 4. As illustrated in FIG. 1, one or more solar cells 10 generate a low voltage current that powers the charge electronics 20 used to charge a battery 40. In turn, the battery 40 powers the load 50 (e.g., an RF tile assembly). A back-propagation neural network 30 receives inputs from a series of sensors monitoring the battery voltage, charge current, and temperature, and outputs a charge control signal to the charge electronics 20. It should be understood that other parameters indicating the state of the battery could be monitored by sensors and used as inputs to the neural network in addition to, or in place of the parameters listed above.

FIG. 4 provides a more detailed block diagram of the neural network battery charger 30. The general concept of using a back-propagation neural network to control battery charging has been disclosed by Harvey, "The Use of Neural Networks In A Smart Battery Charger" (M.S. degree thesis, University of Missouri—Rolla, 1995). However, this thesis did not apply this concept specifically to lithium-ion batteries or to the general field of phased array antennas.

Returning to FIG. 4, the telemetry received from the battery 40 includes the battery voltage, charge current, and temperature. These inputs are subjected to a linear transformation and are normalized in block 31 to produce an input vector having values in the approximate range of 0.2 to 0.8 for the neural network 32. The neural network 32 preferably has three layers, with three nodes in the input layer, seven nodes in the intermediate layer, and one node in the output layer. A linear transform 33 can also be applied to the output of the neural network 32 to produce a charge control signal having a desired range for the charge electronics 20.

The neural network 30 has previously been trained using sets of input data to produce an acceptable charge control signal. It should be understood that other types of neural networks could be substituted, or that other configurations of back-propagation neural networks could be used.

The uniqueness of this approach deals with the ability of the network to be "trained" from actual orbital charge/discharge data, eliminating the need for thousands of lines of code, computation, etc. and supplying a robust charge control capable of dealing with the nonlinear battery system. The neural network can also take into account the variation of required charge due to changing orbital configuration such as changing sun/eclipse time. This is classically a problem with charge logic design, since battery capacity must be maintained at the same high level even when the load on the batteries becomes lessened due to shortening eclipse time. Such a compromise shortens battery life due to stress upon the battery system. With neural network control, the battery state of charge and peak voltage will be adjusted as needed for the changing battery load due to shortening or lengthening of the eclipse period. The complex relationships in a battery between state of charge, voltage, current, and temperature can be learned by the neural network. The only required inputs to the network are from a training set of data consisting of cell voltage, temperature, and charge current over time.

Other Fields of Use

The present invention can also be applied to a broad spectrum of other types of electronic devices, not only in aerospace, but the automotive industry and numerous commercial markets. In fact, any electronic device whose constituent components operate with small power supplies (such as cellular telephones, hearing aids, calculators, automobile circuits, etc.) would be a potential candidate for the present invention. The light source does not have to be the sun and the photovoltaic cells are not limited to any particular chemistry. For instance, solar-powered calculators operate efficiently using ambient room light.

Because modular power elements in the present invention incorporate "smart" charge control, the need for separate charge equipment can be eliminated. Equipped with one of the present modules, a calculator could be solar powered and still have a long memory for programs and data storage. Cell telephones could be populated with sufficient power modules to operate without the need for recharging within obvious limits. Small modules could potentially be developed to fit into a hearing aid eliminating the need for replacement batteries. Home fire and smoke detectors could be equipped with these modular elements to mitigate the risk of dead batteries.

An automotive application using the present invention could be employed to provide standby power for many of the circuits in a car. In the event that the main battery goes dead, is damaged or removed, the functions of door locks, radio settings, seat positions, GPS functions (included with On Star System) would not be affected.

The potential applications in aerospace are equally numerous. All system components included in attitude control system, control and data handling, navigation systems and communications can be designed using the present invention to incorporate modular power supplies for the various processes within these subsystems. Space-borne electrical power systems may evolve to an entirely new level of technology as this idea becomes available.

The above disclosure sets forth a number of embodiments of the present invention. Other arrangements or embodiments, not precisely set forth, could be practiced under the teachings of the present invention and as set forth in the following claims.

We claim:

1. A power system, comprising:
   a first electrical load;
   a first power module interconnected with said first electrical load and comprising:
   a first battery cell interconnected with said first electrical load;
   first sensors interconnected with said first battery cell;
   a first photovoltaic cell interconnected with said first battery cell, wherein said first photovoltaic cell generates a first low voltage current;
   first charge electronics associated with said first battery cell; and
   a first neural network interconnected with said first sensors and that outputs a first charge control signal to said first charge electronics, wherein said first photovoltaic cell provides said first low voltage current directly to said first battery cell based upon said first charge control signal;
   a second electrical load; and
   a second power module interconnected with said second electrical load and comprising:
   a second battery cell interconnected with said second electrical load;
   second sensors interconnected with said second battery cell;
   a second photovoltaic cell interconnected with said second battery cell, wherein said second photovoltaic cell generates a second low voltage current;
   second charge electronics associated with said second battery cell; and
   a second neural network interconnected with said second sensors and that outputs a second charge control signal to said second charge electronics, wherein said second photovoltaic cell provides said second low voltage current directly to said second battery cell based upon said second charge control signal, wherein said first and second power modules are autonomous and independent of each other.

2. The system of claim 1 wherein each of said first and second battery cells comprise a lithium-ion battery cell.

3. The system of claim 1 wherein each of said first and second neural networks comprise a back-propagating neural network.

4. The system of claim 1 wherein said first sensors monitor at least one of a voltage, a temperature, and a charge current associated with said first battery cell, and wherein said second sensors monitor at least one of a voltage, a temperature, and a charge current associated with said second battery cell.

5. The system of claim 1 wherein said first battery cell is mounted directly on said first electrical load, and wherein said second battery cell is mounted directly on said second electrical load.

6. The system of claim 1 wherein said first photovoltaic cell is interconnected with each of said first battery cell and said first neural network by a first polyimide connection, said first battery cell is interconnected with said first electrical load by a second polyimide connection, said second photovoltaic cell is interconnected with each of said second battery cell and said second neural network by a third polyimide connection, and said second battery cell is interconnected with said second electrical load by a fourth polyimide connection.

7. A phased array antenna system comprising:
- a first and a second transmit/receive (TR) module;
- a first power module interconnected with said first TR module, wherein said first power module comprises:
  - a first battery cell interconnected with said first TR module;
  - first sensors interconnected with said first battery cell;
  - a first photovoltaic cell interconnected with said first battery cell, wherein said first photovoltaic cell generates a first low voltage current;
  - first charge electronics associated with said first battery cell; and
  - a first neural network interconnected with first sensors and that outputs a first charge control signal to said first charge electronics, wherein said first photovoltaic cell provides said first low voltage current directly to said first battery cell based upon said first charge control signal;
- a second electrical load; and
- a second power module interconnected with said second TR module and comprising:
  - a second battery cell interconnected with said second TR module;
  - second sensors interconnected with said second battery cell;
  - a second photovoltaic cell interconnected with said second battery cell, wherein said second photovoltaic cell generates a second low voltage current;
  - second charge electronics associated with said second battery cell; and
  - a second neural network interconnected with second sensors and that outputs a second charge control signal to said second charge electronics, wherein said second photovoltaic cell provides said second low voltage current directly to said second battery cell based upon said second charge control signal, wherein said first and second power modules are autonomous and independent of each other.

8. The phased array antenna system of claim 7 wherein each of said first and second battery cells comprise a lithium-ion battery cell.

9. The phased array antenna system of claim 7 wherein each of said first and second neural networks comprise a back-propagating neural network.

10. The phased array antenna system of claim 7 wherein said first sensors monitor at least one of a voltage, a temperature, and a charge current associated with said first battery cell, and wherein said second sensors monitor at least one of a voltage, a temperature, and a charge current associated with said second battery cell.

11. The phased array antenna of claim 7 wherein said first battery cell is mounted directly on said first TR module, and wherein said second battery cell is mounted directly on said second TR module.

12. The phased array antenna system of claim 7 wherein said first photovoltaic cell is interconnected with each of said first battery cell and said first neural network by a first polyimide connection, said first battery cell is interconnected with said first TR module by a second polyimide connection, said second photovoltaic cell is interconnected with each of said second battery cell and said second neural network by a third polyimide connection, and said second battery cell is interconnected with said second TR module by a fourth polyimide connection.

13. A phased array antenna system comprising a plurality of radio frequency (RF) tiles, wherein at least one of said RF tiles has a front surface and a rear surface, and further includes:
- a plurality of transmit/receive (TR) modules, each having at least one radiator on said front surface of said RF tile;
- a battery powering said TR modules attached to said rear surface of said RF tile;
- sensors monitoring predetermined parameters regarding the state of said battery;
- a photovoltaic cell generating a low voltage current attached to said rear surface of said RF tile;
- a charge regulator regulating current from said photovoltaic cell to charge said battery in response to a charge control signal; and
- a neural network receiving said parameters from said sensors regarding the state of said battery and outputting said charge control signal for said charge regulator.

14. The phased array antenna system of claim 13 wherein said battery comprises a lithium-ion battery.

15. The phased array antenna system of claim 13 wherein said battery is sandwiched between said rear surface of said RF tile and said photovoltaic cell.

16. The phased array antenna system of claim 13 wherein said neural network comprises a back-propagating neural network.

17. The phased array antenna system of claim 13 wherein said battery parameters comprise battery voltage.

18. The phased array antenna system of claim 13 wherein said battery parameters comprises battery temperature.

19. The phased array antenna system of claim 13 wherein said battery parameters comprise charge current.

20. A phased array antenna system comprising:
- a radio frequency (RF) tile that comprises a front surface and a rear surface;
- a plurality of transmit/receive (TR) modules mounted on said front surface of said RF tile, wherein each said TR module comprises at least one radiator;
- a battery cell attached to said rear surface of said RF tile and electrically interconnected with said plurality of TR modules;
- sensors associated with said battery cell;
- a photovoltaic cell electrically interconnected with said battery cell, wherein said photovoltaic cell generates a low voltage current;
- charge electronics electrically interconnected with said battery cell and mounted on a surface of said battery cell that is opposite that which interfaces with said rear surface of said RF tile; and
- a neural network electrically interconnected with both said sensors and said charge electronics and mounted on said surface of said battery cell that is opposite that which interfaces with said rear surface of said RF tile, wherein said photovoltaic cell provides said low voltage current to said battery cell based upon said charge control signal.

* * * * *